US009508015B2

(12) United States Patent
Strauss et al.

(10) Patent No.: US 9,508,015 B2
(45) Date of Patent: Nov. 29, 2016

(54) METHOD FOR EVALUATING IMAGE DATA OF A VEHICLE CAMERA TAKING INTO ACCOUNT INFORMATION ABOUT RAIN

(71) Applicants: Continental Teves AG & Co. oHG, Frankfurt (DE); Conti Temic microelectronic GmbH, Nuremberg (DE)

(72) Inventors: Matthias Strauss, Pfungstadt (DE); Matthias Komar, Frankfurt am Main (DE); Stefan Hegemann, Wangen (DE); Dieter Kroekel, Eriskirch (DE)

(73) Assignees: Continental Teves AG & Co. oHG, Frankfurt (DE); Conti Temic microelectronic GmbH, Nuremberg (DE)

( * ) Notice: Subject to any disclaimer, the term of this patent is extended or adjusted under 35 U.S.C. 154(b) by 124 days.

(21) Appl. No.: 14/360,744

(22) PCT Filed: Nov. 16, 2012

(86) PCT No.: PCT/DE2012/100350
§ 371 (c)(1),
(2) Date: May 27, 2014

(87) PCT Pub. No.: WO2013/083120
PCT Pub. Date: Jun. 13, 2013

(65) Prior Publication Data
US 2015/0220792 A1 Aug. 6, 2015

(30) Foreign Application Priority Data
Dec. 5, 2011 (DE) ........................ 10 2011 056 051

(51) Int. Cl.
G06K 9/00 (2006.01)
B60R 1/00 (2006.01)
G06K 9/46 (2006.01)

(52) U.S. Cl.
CPC ............ *G06K 9/00791* (2013.01); *B60R 1/00* (2013.01); *G06K 9/4604* (2013.01); *G06K 9/4661* (2013.01); *B60R 2300/8053* (2013.01)

(58) Field of Classification Search
None
See application file for complete search history.

(56) References Cited

U.S. PATENT DOCUMENTS

| 5,923,027 | A | 7/1999 | Stam et al. |
|---|---|---|---|
| 5,987,152 | A | 11/1999 | Weisser |
| 6,323,477 | B1 | 11/2001 | Blasing et al. |
| 6,331,819 | B1 | 12/2001 | Hog |
| 6,376,824 | B1 | 4/2002 | Michenfelder et al. |
| 6,392,218 | B1 | 5/2002 | Kuehnle |
| 6,555,804 | B1 | 4/2003 | Blasing |
| 6,617,564 | B2 | 9/2003 | Ockerse et al. |
| 6,841,767 | B2 | 1/2005 | Mindl et al. |
| 7,130,448 | B2 | 10/2006 | Nagaoka et al. |
| 7,253,898 | B2 | 8/2007 | Saikalis et al. |
| 7,259,367 | B2 | 8/2007 | Reime |
| 7,609,857 | B2 | 10/2009 | Franz |
| 7,612,356 | B2 | 11/2009 | Utida et al. |
| 7,646,889 | B2 | 1/2010 | Tsukamoto |
| 7,804,980 | B2 | 9/2010 | Sasaki |
| 7,855,353 | B2 | 12/2010 | Blaesing et al. |
| 7,863,568 | B2 | 1/2011 | Fleury |
| 8,270,676 | B2 | 9/2012 | Heinrich et al. |
| 8,274,562 | B2 | 9/2012 | Walter et al. |
| 8,541,732 | B2 | 9/2013 | Rothenhaeusler |
| 8,548,200 | B2 | 10/2013 | Suzuki et al. |
| 8,913,132 | B2 | 12/2014 | Seger et al. |
| 9,058,643 | B2 | 6/2015 | Cord et al. |
| 2001/0028729 | A1 | 10/2001 | Nishigaki et al. |
| 2002/0148987 | A1 | 10/2002 | Hochstein |
| 2003/0138133 | A1* | 7/2003 | Nagaoka et al. ............. 382/104 |
| 2003/0201380 | A1 | 10/2003 | Ockerse et al. |
| 2004/0004456 | A1 | 1/2004 | LeBa et al. |
| 2004/0165749 | A1 | 8/2004 | Holz et al. |
| 2005/0035926 | A1 | 2/2005 | Takenaga et al. |
| 2005/0178954 | A1 | 8/2005 | Yukawa |
| 2005/0206511 | A1 | 9/2005 | Heenan et al. |
| 2005/0231725 | A1 | 10/2005 | Franz |
| 2005/0254688 | A1 | 11/2005 | Franz |
| 2005/0276447 | A1 | 12/2005 | Taniguchi et al. |
| 2006/0076477 | A1 | 4/2006 | Ishikawa |

(Continued)

FOREIGN PATENT DOCUMENTS

| DE | 44 17 385 | 11/1995 |
|---|---|---|
| DE | 195 04 606 | 8/1996 |

(Continued)

OTHER PUBLICATIONS

International Search Report of the International Searching Authority for International Application PCT/DE2012/100350, mailed Mar. 18, 2013, 3 pages, European Patent Office, HV Rijswijk, Netherlands.
PCT International Preliminary Report on Patentability including English Translation of PCT Written Opinion of the International Searching Authority for International Application PCT/DE2012/100350, issued Jun. 10, 2014, 7 pages, International Bureau of WIPO, Geneva, Switzerland.
German Search Report for German Application No. 10 2011 056 051.3, dated Oct. 12, 2012, 5 pages, Muenchen, Germany, with English translation, 5 pages.

(Continued)

Primary Examiner — Atiba O Fitzpatrick
(74) Attorney, Agent, or Firm — W. F. Fasse

(57) ABSTRACT

In a method for evaluating image data of a vehicle camera, information about raindrops on the vehicle's windshield within the field of view of the camera is taken into account in the evaluation of the image data for detection and classification of objects in the environment of the vehicle. Particularly, for example, depending on the number and the size of the raindrops on the windshield, different detection algorithms, image evaluation criteria, classification parameters, or classification algorithms are used for the detection and classification of objects.

10 Claims, No Drawings

(56) References Cited

U.S. PATENT DOCUMENTS

| | | |
|---|---|---|
| 2006/0163458 A1 | 7/2006 | Reime |
| 2006/0228001 A1 | 10/2006 | Tsukamoto |
| 2007/0047809 A1 | 3/2007 | Sasaki |
| 2007/0053671 A1 | 3/2007 | Garg et al. |
| 2007/0216768 A1 | 9/2007 | Smith et al. |
| 2007/0267993 A1 | 11/2007 | Leleve et al. |
| 2007/0272884 A1 | 11/2007 | Utida et al. |
| 2008/0192984 A1* | 8/2008 | Higuchi .............. G08G 1/16 382/104 |
| 2009/0085755 A1 | 4/2009 | Schafer et al. |
| 2009/0128629 A1 | 5/2009 | Egbert et al. |
| 2010/0208060 A1 | 8/2010 | Kobayashi et al. |
| 2011/0031921 A1 | 2/2011 | Han |
| 2011/0043624 A1 | 2/2011 | Haug |
| 2011/0098716 A1 | 4/2011 | Peterson et al. |
| 2011/0128543 A1 | 6/2011 | Choi |
| 2011/0204206 A1 | 8/2011 | Taoka |
| 2011/0253917 A1 | 10/2011 | Rothenhaeusler |
| 2011/0273564 A1 | 11/2011 | Seger et al. |
| 2011/0273582 A1 | 11/2011 | Gayko et al. |
| 2012/0026318 A1 | 2/2012 | Huelsen et al. |
| 2012/0026330 A1 | 2/2012 | Huelsen et al. |
| 2012/0153154 A1 | 6/2012 | Rothenhaeusler et al. |
| 2013/0235381 A1 | 9/2013 | Kroekel et al. |
| 2013/0245945 A1* | 9/2013 | Morita ............. G08G 1/096716 701/533 |
| 2014/0300738 A1 | 10/2014 | Mueller |
| 2014/0321709 A1 | 10/2014 | Kasahara et al. |
| 2015/0070499 A1 | 3/2015 | Roelke et al. |
| 2015/0332099 A1 | 11/2015 | Kosubek et al. |

FOREIGN PATENT DOCUMENTS

| | | |
|---|---|---|
| DE | 197 04 818 | 8/1997 |
| DE | 103 01 468 | 10/2003 |
| DE | 102 30 200 | 1/2004 |
| DE | 197 00 665 | 7/2004 |
| DE | 103 03 046 | 10/2004 |
| DE | 103 16 794 | 11/2004 |
| DE | 102004015040 | 10/2005 |
| DE | 102004037871 | 3/2006 |
| DE | 102005004513 | 3/2006 |
| DE | 102006008274 | 8/2007 |
| DE | 102007061725 | 6/2009 |
| DE | 102008001679 | 11/2009 |
| DE | 102008043737 | 5/2010 |
| EP | 0 832 798 | 4/1998 |
| EP | 1 580 092 | 9/2005 |
| EP | 1 637 837 | 3/2006 |
| EP | 1 764 835 | 3/2007 |
| EP | 1 826 648 | 8/2007 |
| EP | 1 962 254 | 8/2008 |
| EP | 2 057 583 | 5/2009 |
| EP | 2 230 496 | 9/2010 |
| EP | 2 381 416 | 10/2011 |
| JP | 08-030898 A | 2/1996 |
| JP | 2001-160146 A | 6/2001 |
| JP | 2003-315256 A | 11/2003 |
| JP | 2005-292544 A | 10/2005 |
| JP | 2006-184844 A | 7/2006 |
| JP | 2006-227876 A | 8/2006 |
| JP | 2007-228448 A | 9/2007 |
| JP | 2009-092453 A | 4/2009 |
| JP | 2010-096604 A | 4/2010 |
| JP | 2011-165050 A | 8/2011 |
| WO | WO 03/029757 | 4/2003 |
| WO | WO 03/093864 | 11/2003 |
| WO | WO 2005/075248 | 8/2005 |
| WO | WO 2006/015905 | 2/2006 |
| WO | WO 2006/024247 | 3/2006 |
| WO | WO 2009/020918 | 2/2009 |
| WO | WO 2010/072198 | 7/2010 |
| WO | WO 2010/084707 | 7/2010 |
| WO | WO 2011/098716 | 8/2011 |

OTHER PUBLICATIONS

Partial English translation of Japanese Office Action in Japanese Patent Application No. 2014-543769, mailed Jul. 6, 2016, 1 page.
Corrected partial English translation of Japanese Office Action in Japanese Patent Application No. 2014-543769, mailed Jul. 6, 2016, 1 page.

* cited by examiner

METHOD FOR EVALUATING IMAGE DATA OF A VEHICLE CAMERA TAKING INTO ACCOUNT INFORMATION ABOUT RAIN

FIELD OF THE INVENTION

The invention relates to a method for evaluating image data of a vehicle camera, said method being in particular used in a driver assistance system.

BACKGROUND INFORMATION

Rain sensors and light sensors are incorporated already into many vehicles today in order to control the actuation of windshield wipers or vehicle lights. As more and more vehicles have cameras integrated as a basis for assistance or comfort functions, rain or light detection is also increasingly performed using a camera.

In WO 2010/072198 A1 rain detection is described which uses a camera that at the same time is also used for automotive driver assistance functions. A bifocal optic is used for rain detection, producing a sharp image of a partial region of the windshield on a partial region of the camera image sensor.

EP 2057583 B1 shows a camera-based driver assistance function for the automatic light control of headlamps, which distinguishes the vehicle lights of vehicles ahead or oncoming vehicles from reflectors. The headlamps of one's own vehicle can thus be controlled automatically such that blinding of the drivers of vehicles travelling ahead or of oncoming vehicles is prevented.

The range and distribution of the illumination provided by the headlamps can be adjusted accordingly to vehicles ahead and oncoming vehicles.

Difficulties arise with camera-based driver assistance functions due to environmental effects such as rain or darkness at night, which can considerably affect the imaging quality of the camera.

SUMMARY OF THE INVENTION

In view of the above, it is an object of at least one embodiment of the invention to overcome or avoid these difficulties in the prior art.

A basic idea of the invention is to use information provided by a rain or light sensor system in order to adjust accordingly assistance and object detection functions based on the data of a vehicle camera.

A method for evaluating the image data (or a method for object detection by means) of a vehicle camera according to the invention provides that information about raindrops on a window and/or information about the detected lighting conditions within the field of view of the vehicle camera is taken into account in the evaluation of the image data (or detection of objects).

Information about raindrops in particular includes the number and the size of the raindrops (or generally the precipitation particles), wherein precipitation particles comprising hailstones, snowflakes, ice crystals and dirt particles as well as raindrops, are regarded as "raindrops" as that term is used in the sense of the presently claimed invention.

Information about the detected lighting conditions is in particular the brightness of the surroundings (e.g. day/night, driving through tunnels), wherein also individual light sources such as, for example, street lights or vehicle lights can be part of the detected lighting conditions.

It is regarded as an advantage that the evaluation of image data or the detection of objects becomes more reliable because the information about raindrops or the lighting conditions is taken into account. The detection reliabilities of objects can thus be estimated in a better manner, such that even difficult situations can be dealt with by the camera system.

According to a preferred embodiment the information (raindrops or lighting conditions) is determined from the image data. This means that the vehicle camera serves simultaneously as a rain and/or light sensor, e.g. within a partial region of the image sensor as shown in WO 2010/072198 A1. The detection of rain and/or the lighting conditions is now taken into account for the (further) evaluation of image data or object detection for driver assistance functions.

In particular the effect of rain and/or light on camera functions can thus be estimated in a better manner, as the same camera detects the weather/lighting situation directly and the resulting visibility properties can thus be best estimated.

Advantageously, in the evaluation of the image data at least one criterion (e.g. a threshold value) regarding a detection of edges in the image from the image data can be varied as a function of the information (about raindrops on the window and/or detected lighting conditions within the field of view of the vehicle camera).

For example, the influence on the edges seen by the camera (light/dark or color transitions) can be estimated from a detected rain intensity. These edge transitions are mostly smoother in the event of rain, which means that the edge gradient is less steep than it would be without rain. Edge-based evaluation methods should therefore be adjusted accordingly as to their threshold values. Correspondingly, multiple parameterizations can be used depending on the weather situation and depending on the detected weather condition.

In particular a quality criterion of the image data can be derived from the information, which is taken into account in the evaluation of the image data.

Preferably individual assistance functions can be switched off entirely at a certain rain intensity if the quality of the sensor signals is no longer sufficient, i.e. if the quality criterion of the image data falls below a minimum value.

Advantageously, assistance functions providing speed control are restricted as to the maximum controllable speed. In particular it might not be possible any longer to activate an ACC (Adaptive Cruise Control) in heavy rain at higher speeds, and this would be communicated to the driver. The maximum speed which can be activated or controlled is preferably determined as a function of a quality criterion of the image data.

According to an advantageous embodiment, "blockage detection" can be performed. Usually, the windshield wipers are turned on in the event of rain. They may overlap regions of the image. In this case, tracking of objects in subsequent images of an image sequence (object tracking) can be made more stable with regard to failures of individual images. Objects can thus be assessed as valid across multiple cycles, even if individual measurements are missing.

This is preferably also the case for the detection of a gush of water, because here, objects may also not be detectable any longer in individual images of an image sequence. If a gush of water has been detected, advantageously functions which have already been triggered accurately can remain active and the triggering of new functions can be prevented.

DETAILED DESCRIPTION OF EXAMPLE EMBODIMENTS OF THE INVENTION

The invention will now be explained in greater detail with reference to exemplary embodiments.

With the camera, e.g. vehicle rear ends can be detected and classified. To begin with, this detection is edge-based.

In a first step, the image is searched for basic properties such as rear lamps, vehicle outlines, or a shadow beneath the vehicle.

As there are mostly no vehicle shadows in the event of rain, greater emphasis can be put on the lamps or on edge detection in this case, for example.

At night lamp detection can be taken into account even more, because due to the darkness hardly any other property will be visible any longer. It is particularly illumination which plays an essential role in the number and quality of the measuring points.

As a general rule, at night the visual range of some functions is practically limited to the illumination range of the lamps. Here, the illumination limit can be used as the detection limit for a reliable detection of non-illuminated objects within the surroundings of the vehicle.

In the subsequent step the classification of the detected vehicles can also be adjusted to the weather situation as to its parameters or the way in which it is performed. Special classifiers can be used for different weather conditions, for example.

It is possible, for example, to develop different classification algorithms/parameters for different weather situations. Also here, the classification algorithm is then used which has been trained for the corresponding ambient conditions (rain/light).

According to the weather situation, individual detection algorithms can also be switched off and others can be relied on more.

Furthermore, the signal qualities of the objects provided by the camera or other weather-dependent sensors such as, e.g., lidar or PMD (Photonic Mixing Device) can be assessed in a better manner, such that in particular a quality criterion of the image data can be derived from the information about rain or lighting conditions.

Apart from edge detection and the classification algorithms, the gathering of information about color can also be adjusted.

Lane markings often appear as a black line on light ground at night and in the event of rain, even irrespectively of their own color (yellow/white). Based on this knowledge, algorithms for lane marking detection can be designed to be more robust.

Another option is to activate/adapt the vehicle lighting (low beam, high beam, fog lamps) accordingly to obtain any remaining information about color. Preferably also special low-glare lamps having the corresponding light temperature can be installed on the vehicle and activated additionally.

For highly automated driving up to autonomous driving it is of particular interest how far into the future (or how far on the path in the direction of travel) a defined signal reliability can be assured. Thus also highly automated systems can adjust the driving speed accordingly. Driving faster would then be possible only manually.

The invention claimed is:

1. A method comprising steps:
    a) with a camera in a vehicle, producing first image data representing an object in outside surroundings of the vehicle and second image data representing precipitation particles on an area of a windshield of the vehicle;
    b) evaluating the second image data to determine precipitation particle information including a number and/or a size of the precipitation particles on the area of the windshield; and
    c) evaluating the first image data by applying at least one evaluation algorithm comprising an edge detection algorithm with at least one evaluation parameter to detect and classify the object, wherein the evaluation parameter comprises an edge detection threshold value for determining which ones of image transitions in the first image data are regarded as edges, and selecting or changing the edge detection threshold value in response to and dependent on the precipitation particle information.

2. The method according to claim 1, further comprising providing plural different parameterizations, and wherein the selecting or changing in the step c) comprises selecting, as the edge detection threshold value, a respective one of the parameterizations in response to and dependent on the precipitation particle information.

3. The method according to claim 1, further comprising providing plural different classifiers for classifying the object, and wherein the step c) further comprises selecting, as the evaluation algorithm for classifying the object, one of the classifiers in response to and dependent on the precipitation particle information.

4. The method according to claim 1, further comprising providing plural different classification algorithms that have been respectively trained for operation under respective different conditions of the precipitation particle information, and wherein the step c) further comprises selecting, as the evaluation algorithm for classifying the object, a respective one of the classification algorithms that has been trained for operation at the respective condition corresponding to the precipitation particle information determined in the step b).

5. The method according to claim 1, further comprising providing plural different detection algorithms for detecting the object, and wherein the step c) further comprises selecting, as the evaluation algorithm for detecting the object, a respective one of the detection algorithms in response to and dependent on the precipitation particle information.

6. The method according to claim 1, wherein the precipitation particles are raindrops.

7. The method according to claim 1, wherein the precipitation particles are hailstones, snowflakes or ice crystals.

8. The method according to claim 1, further comprising comparing the precipitation particle information to a threshold requirement, and switching off a driver assistance function of a driver assistance system of the vehicle when the precipitation particle information fails to satisfy the threshold requirement.

9. The method according to claim 1, further comprising adjusting a maximum speed limitation of an adaptive cruise control of the vehicle in response to and dependent on the precipitation particle information.

10. A method comprising steps:
    a) with a camera in a vehicle, producing first image data representing an object in outside surroundings of the vehicle and second image data representing precipitation particles on an area of a windshield of the vehicle;

b) evaluating the second image data to determine precipitation particle information including a number and/or a size of the precipitation particles on the area of the windshield; and
c) evaluating the first image data at least by gathering color information from the first image data to detect and classify the object, and changing the gathering of the color information in response to and dependent on the precipitation particle information.

* * * * *